United States Patent
Synnergren et al.

(10) Patent No.: US 10,721,686 B2
(45) Date of Patent: Jul. 21, 2020

(54) METHOD FOR CONTROLLING A TELEMATIC CONTROL UNIT

(71) Applicant: Telefonaktiebolaget LM Ericsson (publ), Stockholm (SE)

(72) Inventors: Per Synnergren, Gammelstad (SE); Stefan Runeson, Lund (SE); Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/468,573

(22) PCT Filed: Nov. 9, 2017

(86) PCT No.: PCT/SE2017/051115
§ 371 (c)(1),
(2) Date: Jun. 11, 2019

(87) PCT Pub. No.: WO2018/111171
PCT Pub. Date: Jun. 21, 2018

(65) Prior Publication Data
US 2020/0196235 A1     Jun. 18, 2020

Related U.S. Application Data

(60) Provisional application No. 62/434,024, filed on Dec. 14, 2016.

(51) Int. Cl.
*H04M 3/00* (2006.01)
*H04W 52/02* (2009.01)
(Continued)

(52) U.S. Cl.
CPC ......... *H04W 52/0216* (2013.01); *H04W 4/38* (2018.02); *H04W 4/40* (2018.02);
(Continued)

(58) Field of Classification Search
CPC ... H04W 52/0218; H04W 4/38; H04W 76/28; H04W 4/40; H04W 8/245; H04M 1/72519; H04M 1/72522
(Continued)

(56) References Cited

U.S. PATENT DOCUMENTS

2012/0215641 A1*   8/2012   Ohki ................... G08G 1/0112
                                                            705/14.62
2016/0163129 A1*   6/2016   Elnajjar ............... G07C 5/0808
                                                            701/29.6
(Continued)

FOREIGN PATENT DOCUMENTS

EP     3253132 A1    12/2017
WO   2016140274 A1    9/2016

OTHER PUBLICATIONS

International Search Report and Written Opinion for International Patent Application No. PCT/SE2017/051115, dated Jan. 19, 2018, 9 pages.

*Primary Examiner* — Danh C Le
(74) *Attorney, Agent, or Firm* — Withrow & Terranova, PLLC

(57) ABSTRACT

A method for control of a telematic control unit comprises obtaining of information of discontinuity-beneficial conditions, associated with a vehicle to which the telematic control unit is connected. The discontinuity-beneficial conditions indicate that an extended discontinuous reception mode would be beneficial for the telematic control unit and the vehicle to which it is connected. A determination of an extended discontinuous reception time for the telematic control unit to propose is obtained. A request for an extended discontinuous reception mode for the telematic control unit is initiated as a response to obtained discontinuity-beneficial conditions, proposing the determined extended discontinu-
(Continued)

ous reception time. A telematic control unit configured for performing such a control method is also presented.

15 Claims, 9 Drawing Sheets

(51) Int. Cl.
    *H04W 4/38*     (2018.01)
    *H04W 4/40*     (2018.01)
    *H04W 76/28*     (2018.01)
    *H04M 1/725*     (2006.01)
    *H04W 8/24*     (2009.01)

(52) U.S. Cl.
    CPC ........ *H04W 76/28* (2018.02); *H04M 1/72519* (2013.01); *H04M 1/72522* (2013.01); *H04W 8/245* (2013.01)

(58) Field of Classification Search
    USPC .................................. 455/418, 550.1, 414.3
    See application file for complete search history.

(56) References Cited

U.S. PATENT DOCUMENTS

| | | |
|---|---|---|
| 2016/0205622 A1 | 7/2016 | Ronneke et al. |
| 2016/0283896 A1* | 9/2016 | Dziurda ............... G06Q 10/087 |
| 2016/0295504 A1 | 10/2016 | Wang et al. |
| 2017/0016266 A1* | 1/2017 | Van Wiemeersch ... B60K 35/00 |
| 2017/0108348 A1* | 4/2017 | Hansen .................. H04W 4/44 |
| 2017/0166054 A1* | 6/2017 | Ayala Rodriguez ......................... A61B 5/6801 |
| 2017/0245138 A1* | 8/2017 | Waldner .................. H04W 4/80 |
| 2017/0249007 A1* | 8/2017 | Hardin .................. G06F 1/3287 |
| 2017/0349148 A1* | 12/2017 | Bojanowski ....... G01C 21/3492 |
| 2018/0063882 A1* | 3/2018 | MacDonald .......... H04W 76/14 |

* cited by examiner

METHOD FOR CONTROLLING A TELEMATIC CONTROL UNIT

This application is a 35 U.S.C. § 371 national phase filing of International Application No. PCT/SE2017/051115, filed Nov. 9, 2017, which claims the benefit of U.S. Provisional Application No. 62/434,024, filed Dec. 14, 2016, the disclosures of which are incorporated herein by reference in their entireties.

TECHNICAL FIELD

The proposed technology generally relates control of telematic control units and in particular to methods and arrangements for sleep mode control for connected telematic control units of vehicles using extended discontinuous reception.

BACKGROUND

Cooperative Intelligent Transport Systems (C-ITS) are systems that utilize Information and Communications Technology (ICT) to support improved safety and more efficient usage of the transportation infrastructure for transport of goods and humans over any transportation mean.

Intelligent Transport Systems (ITS) services, protocols and connectivity solutions are described in specifications issued by standardization bodies like IEEE, SAE, ETSI and ISO. Besides in the mentioned standards, the C-ITS system architecture is elaborated in research collaborations like COmmunication Network VEhicle Road Global Extension (CONVERGE), Nordic Way and in consortiums of automobile manufacturers, suppliers and research organizations like ERTICO and Car-2-Car Communication Consortium.

There is an ongoing discussion regarding connectivity for C-ITS. The discussion is about whether the ETSI ITS G5/IEEE WAVE DSRC solutions, cellular $3^{rd}$ Generation Partnership Project (3GPP) technologies, or a new 3GPP based Long-Term Evolution (LTE) Vehicle-to-anything (V2X) radio solutions should be used, and in what combinations (e.g. hybrid solutions). C-ITS is based on a frequent short-range communication between different stations or units, mobile or stationary, exchanging e.g. information ranging from position, velocity, environmental conditions, traffic situation etc. When many vehicles are present in a limited area and/or when external conditions are cumbersome, the signaling load becomes large and congestion problems may arise.

Vehicles are getting connected to mobile networks. They are using Telematic Control Units (TCUs) located in vehicles, (normally) integrated in the vehicle electronical system or connected via an external interface such as the On Board Diagnostics II (OBD II) interface. They are equipped with a radio for communicating via a cellular network with an application server. The application server is under the control of e.g. the vehicle Original Equipment Manufacturer (OEM) or another 3rd party service supplier. In addition the TCU might have radios for short range communication, e.g. Dedicated Short-Range Communications (DSRC) or in the future LTE technology (LTE-V) might be used for the short range communication.

The TCU is sometimes also referred to as a Telematics Module (TEM) or an On Board Unit (OBU).

Being integrated or connected to the vehicles external interface means that the TCU can receive events from the vehicle system, forward this to the OEM, forward information to other vehicles or road side equipment using the short range communication or to forward the information to road traffic authorities using the cellular network. The TCU can of course also receive information on the short range radio or from the cellular network and display or forward that information. E.g. a wheel that loses the grip can be detected by the vehicle system and a slippery road warning can be distributed with a broadcast message on the short range radio or sent to a central entity for evaluation. Alternatively, the received information can be acted upon by the vehicle, e.g. a received message about slippery road can activate the anti-spin system of the vehicle.

There is a feature in mobile networks to allow devices to go into extended sleep mode, extended discontinuous reception (eDRX). The length of the sleep mode can be proposed by the device, current maximum sleep time is 2.9 hours. The eDRX feature is controlled by sending information during the attach procedure and the Tracking Area update procedure.

Even though a car is equipped with a powerful battery, there are several systems in the car that consumes power, e.g. alarm, computers, etc. A vehicle might also be parked for a long time, e.g. before shipping to customer, at an airport etc. so there is a need to optimize the battery usage.

SUMMARY

It is an object to provide technology that improves the energy optimization of a telematic control unit.

According to a first aspect, there is provided a method for control of a telematic control unit. The method comprises obtaining of information of discontinuity-beneficial conditions, associated with a vehicle to which the telematic control unit is connected. The discontinuity-beneficial conditions indicate that an extended discontinuous reception mode would be beneficial for the telematic control unit. A determination of an extended discontinuous reception time for the telematic control unit to propose is obtained. A request for an extended discontinuous reception mode for the telematic control unit is initiated as a response to obtained discontinuity-beneficial conditions, proposing the determined extended discontinuous reception time.

According to a second aspect, there is provided a telematic control unit. The telematic control unit is configured to obtain information of discontinuity-beneficial conditions, associated with a vehicle to which the telematic control unit is connected. The discontinuity-beneficial conditions indicate that an extended discontinuous reception mode would be beneficial for the telematic control unit. The telematic control unit is further configured to obtain a determination of an extended discontinuous reception time for the telematic control unit to propose. The telematic control unit is further configured to initiate a request for an extended discontinuous reception mode for the telematic control unit as a response to obtained discontinuity-beneficial conditions, proposing the determined extended discontinuous reception time.

According to a third aspect, there is provided a computer program comprising instructions, which when executed by at least one processor, cause the processor(s) to obtain information of discontinuity-beneficial conditions, associated with a vehicle to which the telematic control unit is connected. The discontinuity-beneficial conditions indicate that an extended discontinuous reception mode would be beneficial for the telematic control unit. The instructions, when executed by the processor(s), further cause the processor(s) to obtain a determination of an extended discontinuous reception time for the telematic control unit to propose. The instructions, when executed by the processor(s), further cause the processor(s) to initiate a request for an extended discontinuous reception mode for the telematic control unit as a response to obtained discontinuity-beneficial conditions, proposing the determined extended discontinuous reception time.

According to a fourth aspect, there is provided a computer-program product comprising a computer-readable medium having stored thereon a computer program of the third aspect.

According to a fifth aspect, there is provided a carrier comprising the computer program of the third aspect, wherein the carrier is one of an electronic signal, an optical signal, an electromagnetic signal, a magnetic signal, an electric signal, a radio signal, a microwave signal, or a computer-readable storage medium.

According to a fifth aspect, there is provided a telematic control unit. The telematic control unit comprises a condition obtaining module for obtaining of information of discontinuity-beneficial conditions, associated with a vehicle to which the telematic control unit is connected. The discontinuity-beneficial conditions indicate that an extended discontinuous reception mode would be beneficial for the telematic control unit. The telematic control unit further comprises a time determination obtaining module for obtaining a determination of an extended discontinuous reception time for the telematic control unit to propose. The telematic control unit further comprises an initiator for initiating a request for an extended discontinuous reception mode for the telematic control unit as a response to obtained discontinuity-beneficial conditions, proposing the determined extended discontinuous reception time.

An advantage of the proposed technology is that battery utilization for the vehicle is optimized.

Other advantages will be appreciated when reading the detailed description here below.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

For a better understanding of the proposed technology, it may be useful to begin with a brief overview of a C-ITS system.

Figure 1:
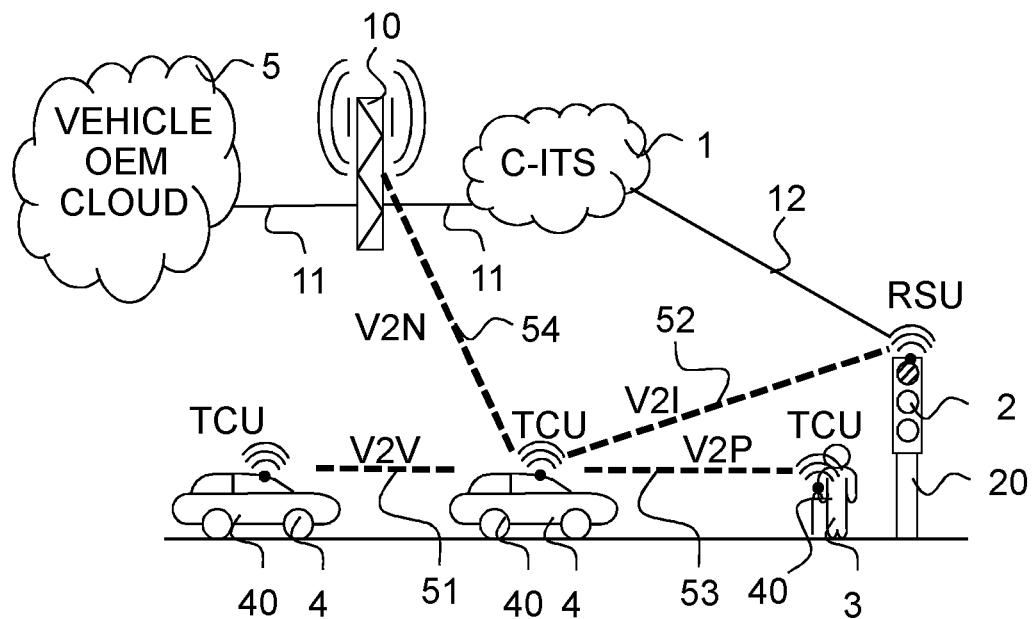
FIG. 1 is a schematic illustration of a C-ITS system.

FIG. 1 depicts schematically a C-ITS system 1. The C-ITS system 1 is connected to communication nodes 10, communicating with the core C-ITS system 1 by internal communication 11, which can be wired and/or wireless. The communication nodes 10 may also be utilized for communication, over an internal communication 11, with vehicle OEM applications 5 in a vehicle OEM cloud. Infrastructure items 2 are provided with Road Side Units (RSU) 20, and communicate with the C-ITS system 1 by a backhaul network 12. This backhaul network can be wired and/or wireless. Non-exclusive examples of common infrastructure items 2 are traffic lights and road signs. Vehicles 4 communicate with different entities in the C-ITS system 1 using a Telematic Control Unit (TCU) 40. The TCU 40 may communicate with RSUs, e.g. via a Vehicle-to-Infrastructure (V2I) solutions, with other TCUs 40, e.g. via Vehicle-to-Vehicle (V2V) solutions, and with the communication nodes 10, e.g. via Vehicle-to-Network (V2N) solutions. TCUs 40 can also be carried by pedestrians 3, where a Vehicle-to-Pedestrian (V2P) solution may be used.

Thus, the communication equipment in these entities is either the RSU 20 or the TCU 40. The TCU 40 can communicate while moving and are either mounted in vehicles 4 or even carried by pedestrians 3. For the pedestrian, the TCU 40 is typically a smartphone, and in such a case, there is no direct connection to any "vehicle".

Telematic Control Units (TCUs) 40 are normally located in vehicles 4, and normally integrated to the vehicle system and dashboard. They are equipped with a radio, e.g. a 3GPP modem for cellular connectivity, furthermore vehicles may be equipped with short range radio technology, e.g. DSRC for short range communication. In the future, LTE technology might be used for the short range communication. The fact that the TCU 40 is integrated means that it for example can receive events from the vehicle system, display that on a dashboard, or when equipped with short range radio technology, forward information to other vehicles 4 or RSUs 40 using the short range communication or to forward the information to road traffic authorities using a cellular network connection 54. The TCU 40 can of course also receive information on the short range radio or from the cellular network and display or forward that information. Of course, the TCU can also act on the received information, e.g. by instructions to the vehicle system to perform an action. In other words, a TCU 40 is a mobile communication equipment. The TCU typically has access to the vehicle control system, e.g. any Global Positioning System (GPS) or other positioning system, e.g. other Global Navigation Satellite Systems (GNSS). The TCU 40 comprises typically functionalities of an UE.

The TCU is also typically equipped with a radio for communicating via a cellular network with an OEM application of an application server. The application server is under the control of e.g. the vehicle Original Equipment Manufacturer (OEM) or another 3rd party service supplier. The OEM application, typically provided in application servers, e.g. in an OEM cloud, is an application associated to the manufacturer of the vehicle. The application of the application server serves the vehicles with automotive services via the communication system. The OEM application is thus a part of a telematics system, typically providing services such as remote diagnostics of the vehicle, remote support for vehicle related actions as well as providing information about traffic to for example facilitate a smooth or efficient ride. The OEM application is typically aware of status parameters of the vehicles as well as other information, e.g. vehicle position.

In order to improve the utilization of the vehicle batteries, a TCU can control and select sleep time depending on information from the internal car system and external sources.

Figure 2:
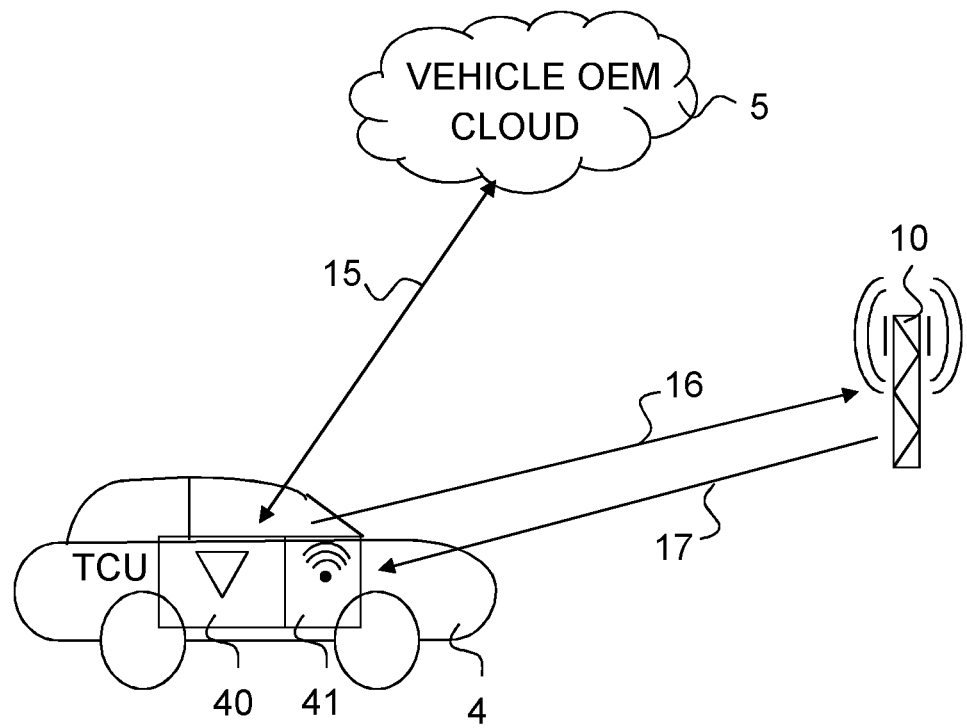
FIG. 2 is a schematic illustration of an embodiment of a sleep time control.

An overview of an embodiment of sleep time control is illustrated in FIG. 2. In a first stage 15, a TCU 40 and OEM application 5, e.g. in a vehicle OEM cloud, negotiate/share information via a cellular network. This information may comprise information about that discontinuity-beneficial conditions are present. Such conditions are discussed more in detail further below. The communication between the TCU 40, typically via a modem 41, and the OEM application 5 is preferably performed via a cellular network, but may also be performed in any of the available communication channels, described above. The TCU 40 may also obtain information about that discontinuity-beneficial conditions are present from other sources, such that the vehicle internal system. The TCU 40 may also obtain information about that discontinuity-beneficial conditions are present from e.g. C-ITS nodes, positioning satellites, and/or a wireless communication network. The information from the OEM application servers, the vehicle internal system, C-ITS nodes, positioning satellites, and/or the wireless communication network may also comprise discontinuity-time influencing parameters, on which a suitable sleep time can be decided, or the information may comprise a determined such suitable sleep time. This will be further discussed further below. The TCU 40 thus takes e.g. vehicle info into account for decision on suitable sleep time, either by its own decision or at suggestion from an external node.

In a second stage 16, the TCU 40 requests sleep time (eDRX), or at least initiates such a request, from the cellular network, preferably using the Tracking Area (TA) update request procedure.

In a third stage 17, the cellular network replies with an accept of the request, preferably using the Tracking Area update accept procedure. The TCU 40 then manages the transfer into the eDRX mode.

Figure 3:
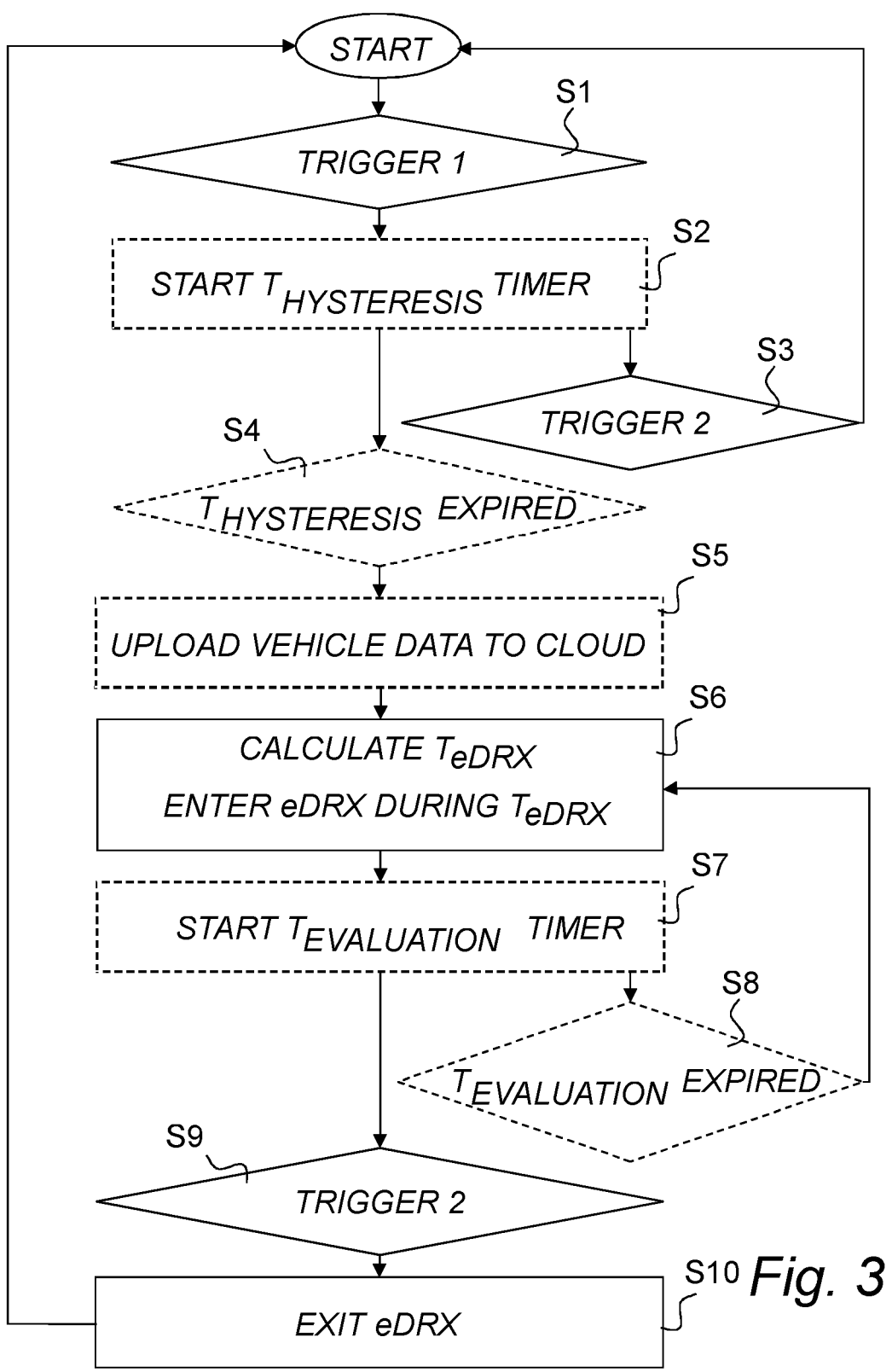
FIG. 3 is a flow diagram of embodiment of a control method.

FIG. 3 shows a flow diagram of embodiment of a control method.

In step S1 a first trigger is obtained by the TCU. The first trigger would in a general sense indicate that the vehicle is no longer used, e.g. parked, and that the driver/owner/passengers are no longer in the vehicle or encountering an issue with the current battery voltage that put the vehicle into power saving mode. This first trigger thus indicates the presence of discontinuity-beneficial conditions concerning the vehicle. Such discontinuity-beneficial conditions may preferably comprise vehicle inactivity conditions, person non-presence conditions, energy conditions, time conditions and/or location conditions, and most preferably comprise vehicle inactivity conditions, person non-presence conditions, energy conditions and/or time conditions.

The first trigger may thus be one or a combination of the discontinuity-beneficial conditions. Examples are given here below.

One type of discontinuity-beneficial conditions is vehicle inactivity conditions. Examples of such vehicle inactivity conditions may e.g. be:

Engine of the vehicle is switched off;
Ignition of the vehicle is switched off; and/or
Internal system indication that the vehicle is going to power saving mode or deeper sleep in terms of communication with the network.

Another type of discontinuity-beneficial conditions is person non-presence conditions. Examples of such person non-presence conditions may e.g. be:

Vehicle is locked from outside;
Keyless system of the vehicle does not sense that the key is in range; and/or
Seat sensor of the vehicle indicate that no person is sitting in the vehicle or the driver seat of the vehicle.

Yet another type of discontinuity-beneficial conditions is energy conditions. An example of such energy conditions may e.g. be:

Low battery voltage in the vehicle.

Yet another type of discontinuity-beneficial conditions is time conditions. An example of such time conditions may e.g. be:

Time of day within predetermined range.

Yet another type of discontinuity-beneficial conditions is location conditions. An example of such location conditions may e.g. be:

Location of the vehicle.

In one particular embodiment, a hysteresis time is used before the actual start of the eDRX. To this end, in a step S2, a $T_{hysteresis}$ timer is started. In this embodiment, the initiating of the request for the extended discontinuous reception mode is thus performed after expiration of a hysteresis time. This hysteresis time starts when information of the discontinuity-beneficial conditions is obtained.

The timer $T_{hysteresis}$ is used to prevent the vehicle from using eDRX too early after Trigger 1 has happened. The driver might e.g. have locked the vehicle before all luggage was removed.

In step S4, it is concluded that the hysteresis time has expired and the process continues to the following steps.

In a further particular embodiment, the method preferably further comprises the step of interrupting the hysteresis processes, or the discontinuity processes as will be discussed further below, as a response to detection of discontinuity-stopping conditions. A presence of discontinuity-stopping conditions concerning the vehicle constitutes the second trigger, as illustrated in step S3 of FIG. 3.

The second trigger would in general be an indication of that the vehicle is to be used. Thus, the discontinuity-stopping conditions may preferably comprise vehicle activity conditions, person presence conditions, energy conditions and/or time conditions.

The second trigger may be one or a combination of the discontinuity-stopping conditions. Examples are given here below.

One type of discontinuity-stopping conditions are vehicle activity conditions. Examples of such vehicle inactivity conditions may e.g. be:

Ignition of the vehicle turned on;
Engine of the vehicle turned on; and
Autonomous driving functionality of the vehicle is activated.

Another type of discontinuity-stopping conditions are person presence conditions. Examples of such person non-presence conditions may e.g. be:

Keyless system indicates that the key is in range;
Vehicle is unlocked; and
Seat sensor indicates that people are in the vehicle.

Yet another type of discontinuity-stopping conditions are energy conditions: (where the vehicle is an electrical vehicle). An example of such energy conditions may e.g. be:

Electrical vehicle is recharged.

Yet another type of discontinuity-stopping conditions are time conditions. An example of such time conditions may e.g. be:

Time of day is within a predetermined range.

Before entering eDRX, the vehicle may in particular embodiments, as illustrated by step S5, upload some vehicle data into an application server. The application server is typically an OEM server serving vehicles with automotive services. This vehicle data may e.g. be battery status of an electrical car etc. In this way, the driver may retrieve this data from the application server while the vehicle is not reachable in eDRX mode.

The system calculates a suitable value of the timer $T_{eDRX}$ as illustrated by step S6. The calculation may be done in the vehicle or in an application server or in any other external node and being reported to the vehicle. In other words, the obtaining of a determination of an extended discontinuous reception time comprises communicating with application servers serving vehicles with automotive services, a vehicle internal system of the vehicle, C-ITS nodes, or receiving information e.g. from positioning satellites. The communication may be using a wireless communication network, e.g. a cellular network.

The calculated value of $T_{eDRX}$, i.e. the extended discontinuous reception time, may be dependent of data of various parameters, here denoted as discontinuity-time influencing parameters. The discontinuity-time influencing parameters can e.g. be time and history related parameters, position related parameters and/or energy related parameters. Examples are given here below:

One type of discontinuity-time influencing parameters is time and history related parameters. Examples of such time and history related parameters may e.g. be:

Time of day;

Day of the week;

The year season;

A pattern from historical parameter values of the vehicle; and

Settings for scheduled autonomous driving events of the vehicle.

Another type of discontinuity-time influencing parameters is position related parameters. Examples of such position related parameters may e.g. be:

Location of the vehicle;

The vehicle out of cellular coverage; and

Vehicle has lost GPS coverage.

The location of the vehicle can be used in different ways. The location may e.g. be combined with historical parameters, identifying locations where the vehicle usually stays for a certain time. The location as such can also be useful, e.g. identifying a position of a map, e.g. a long time parking lot at an airport.

Yet another type of discontinuity-time influencing parameters is energy related parameters. Examples of such energy related parameters may e.g. be:

The vehicle is an electric vehicle and is attached to charging system; and

Temperature at the location of the vehicle.

Based on available discontinuity-time influencing parameters, different considerations concerning the extended discontinuous reception time, $T_{eDRX}$, may be taken. Certain values of certain discontinuity-time influencing parameters may be indicative of an expected long inactivity period, while other values or other discontinuity-time influencing parameters may be indicative of an expected short inactivity period. Combination of more than one parameter may also give additional information. Non-exclusive examples could be combination of location and time, combination of location and history information, combination of temperature and time etc. Algorithms for determining an appropriate extended discontinuous reception time can be designed in many different ways, depending on the available parameters.

Some non-exclusive examples of considerations that the algorithms used to determine $T_{eDRX}$ may take are presented here below, to give some understanding of the possibilities that are given.

A longer $T_{eDRX}$ can be given at night. The probability is lower that the driver will access the connected car during night time.

A shorter $T_{eDRX}$ can be given at low outside temperature. There is a higher probability that the driver wishes to remotely switch on heating of the connected car. If different types of conditions are combined, the outside temperature can be combined with time, e.g. close to dawn, or additionally based on history, e.g. one hour before the time when the vehicle normally is started.

Based on historical and position data the $T_{eDRX}$ may be renegotiated at certain times of the day (or day of the week or season of the year). For instance, the $T_{eDRX}$ may be re-negotiated to a shorter value close to what historical and position data indicate may be start or end of a working day.

Based on location, a long $T_{eDRX}$ can be given e.g. if the vehicle is parked at a long time stay parking lot.

Based on combination of location and historical use, a $T_{eDRX}$ may e.g. be set equal to the last or average parking time if the vehicle is parked at a particular parking lot.

A shorter $T_{eDRX}$ may be given when the vehicle is charging. The driver may under such circumstances want to check charging status remotely. Furthermore, power consumption is less important when the vehicle is connected to an electrical grid.

As also illustrated by step S6, the TCU uses the determined $T_{eDRX}$ to request and manage the entering in to the eDRX mode.

Typically, the TCU 40 initiates an eDRX mode request, requesting a sleep time (eDRX), from the cellular network. Preferably, TCU uses the Tracking Area (TA) update request procedure. The cellular network replies with an accept of the request, preferably using the Tracking Area update accept procedure.

The TCU 40 then manages the transfer of the TCU into the eDRX mode. Additional power savings can be achieved by turning off the cellular modem in case cellular coverage is lost, i.e. there is no idea to spend power on searching for a cell in this location. In this scenario the modem part informs the TCU that coverage is lost, the TCU then orders the modem to stop scanning for cellular coverage. When TCU is informed from the vehicle system that vehicle is moving, the TCU instructs the UE modem to resume scanning for cellular coverage.

Similar handling can be performed if GPS signal is lost. That is, the searching for GPS signals at current position is suspended, and the searching is resumed when vehicle is moved again.

In particular embodiments, there should preferably be information from the TCU to the internal vehicle system indicating that the vehicle systems should not expect being contacted by the server for the duration of the sleep time to adapt the protocols in the vehicle to this. In other words, UpLink (UL) traffic, for example periodic registrations etc. needs to be stopped or paused as well. The UL traffic attempts could be rejected or stopped or blocked by the TCU as well, or by other SW or equipment that controls the network connectivity.

Also the OEM application server should preferably be informed that the vehicle will go into sleep mode and will not initiate contact or be reachable for a certain time, i.e. so that application(s) can adjust its expectations about re-registrations etc.

In a particular embodiment, a timer $T_{evaluation}$ is preferably used to regularly or intermittently re-evaluate the value of $T_{eDRX}$ during the extended discontinuous reception mode. Therefore in step S7, the $T_{evaluation}$ timer is started. When the $T_{evaluation}$ timer expires, as illustrated by step S8, the process returns to the step S6, where the value of the $T_{eDRX}$ may be re-evaluated. The conditions determining the $T_{eDRX}$ may have changed. The temperature may e.g. have changed considerably, so that another approach for selecting the $T_{eDRX}$ value may be beneficial. Such an evaluation possibility also opens up for, for instance, to enable to renegotiate $T_{eDRX}$ at what is the system assumes to be close to the end of a working day. Many other scenarios, at which a renegotiation of the $T_{eDRX}$ might be beneficial are also possible. The parameter $T_{evaluation}$ should be selected to be long enough for not influencing the power consumption in any significant degree, but short enough to enable recalculations of changing conditions.

The parameter $T_{evaluation}$ can also be set differently depending on different conditions. As one non-exclusive example, if the season of the year is such that large temperature fluctuations are expected, e.g. during nights, the parameter $T_{evaluation}$ can be set shorter, in order to pick up any such temperature fluctuations.

A presence of discontinuity-stopping conditions concerning the vehicle constitutes the second trigger, as illustrated in step S9 of FIG. 3. This is in analogy with the stopping of the hysteresis time as discussed above.

If such a second trigger is obtained or if the extended discontinuous reception time expires, the extended discontinuous reception mode is exited in step S10.

Figure 4:
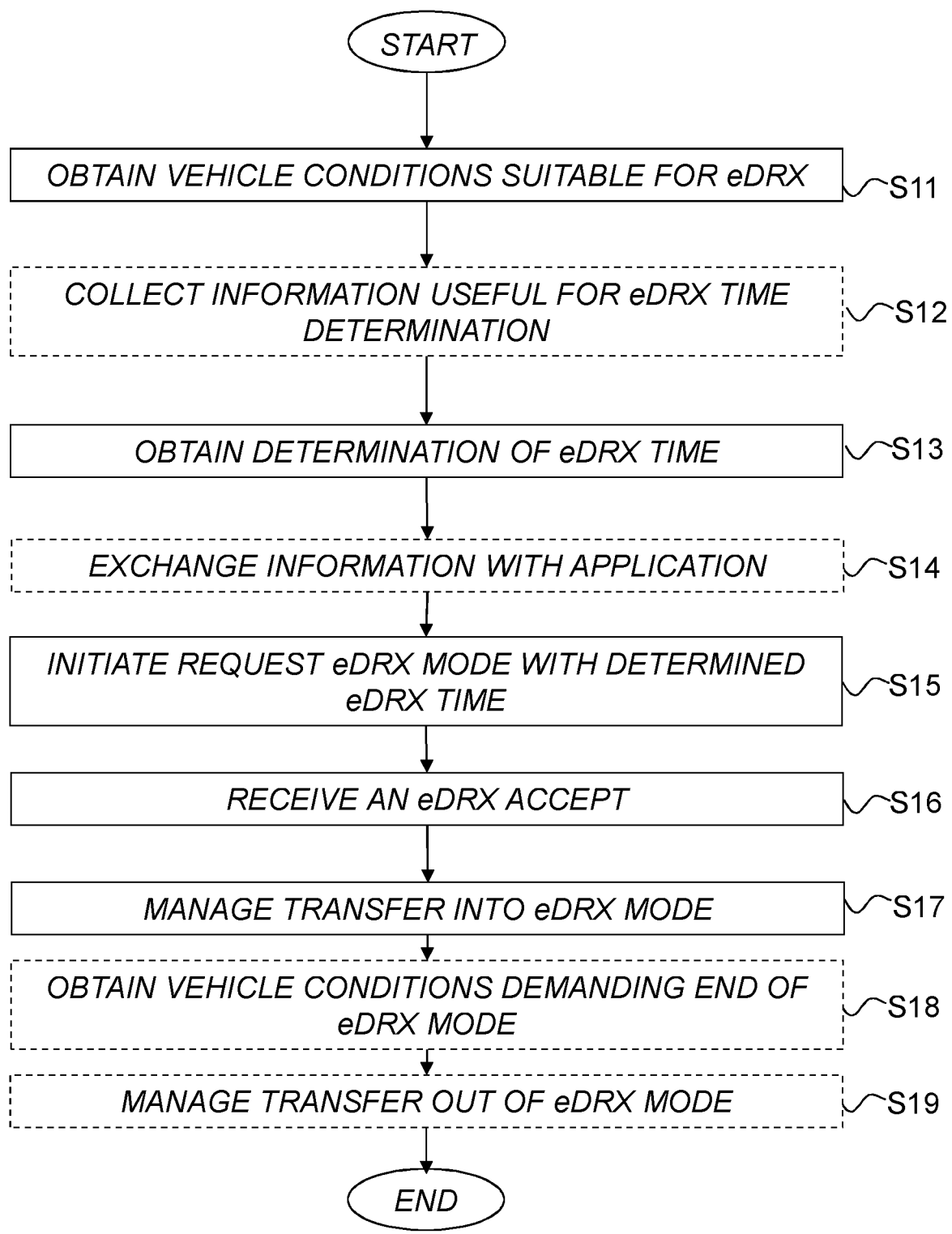
FIG. 4 is a schematic flow diagram illustrating an embodiment of a method for controlling a TCU.

FIG. 4 is a schematic flow diagram illustrating an embodiment of a method for controlling a TCU. In step S11, information of conditions indicating that an extended discontinuous reception mode would be beneficial for the TCU are obtained. The conditions may therefore be denoted as discontinuity-beneficial conditions. The discontinuity-beneficial conditions are associated with a vehicle to which the TCU is connected. This is typically performed in cooperation with the vehicle control system. In other words, the step of obtaining information of discontinuity-beneficial conditions comprises preferably communicating with a vehicle internal system. The conditions are associated with an expected time of inactivity of the vehicle or an expected shortage of stored electrical power. In other words, the discontinuity-beneficial conditions preferably comprises at least one of vehicle inactivity conditions, person non-presence conditions, energy conditions and time conditions. Non-exclusive examples are status conditions of the engine, the lock of the vehicle or any absence of a driver. Other examples are given further above.

In a particular embodiment, information useful for an eDRX time determination is collected in step S12. This information comprises typically position information, in particular connected with coverage information, time information such as the time of the day or the day of the week, surrounding conditions, such as temperature and compilation of historical uses of an eDRX mode or historical use of the vehicle as such, see also previous discussions and examples. Such an information can be accessed by different kinds of communication, e.g. interaction with the vehicle control system, positioning procedures, or retrieving of stored data e.g. in an OEM application or other application with which the TCU can communicate.

In step S13, a determination of an extended discontinuous reception time for the TCU to propose is obtained.

In one particular embodiment, such obtaining of a determination comprises performing the determination, entirely or in part, by the TCU. In this alternative, the obtaining of a determination of an extended discontinuous reception time thus comprises receiving of data of discontinuity-time influencing parameters. These discontinuity-time influencing parameters are received from application servers serving vehicles with automotive services, the vehicle internal system of the vehicle, the C-ITS nodes, the positioning satellites, and/or the wireless communication network. A determining of the extended discontinuous reception time is then performing based on the received data of discontinuity-time influencing parameters. This is preferably combined with the performing of step S12.

In another particular embodiment, such obtaining of a determination comprises requesting a determination of an extended discontinuous reception time from an external node, e.g. from an OEM application or other application. The obtaining of the determination further comprises receiving of the determination. In other words, in this alternative, the obtaining of a determination of an extended discontinuous reception time comprises receiving the determined extended discontinuous reception time from application servers serving vehicles with automotive services, the vehicle internal system of the vehicle, the C-ITS nodes, the positioning satellites, or the wireless communication network.

The extended discontinuous reception time should be determined for optimizing the use of the extended discontinuous reception functionality. The requested time should be an "intelligent" estimation of an expected non-activity time of the vehicle and/or vital communications to/from the vehicle. In most typical cases, a combination of a location related information and collected historical parameter values, possible also combined with time information. A suitable extended discontinuous reception time when the vehicle is parked outside a lunch restaurant should probably be shorter than when the vehicle is parked in the evening outside a residence house. By use of the historical information, specific for each vehicle, regular movements with the vehicle can be tracked and suitable extended discontinuous reception time can be proposed.

In a particular embodiment, information about the vehicle that might be useful for a user is provided S14 to e.g. an application server. The application server is typically an OEM server serving vehicles with automotive services. This information will thereby become available despite of any eDRX mode. Information from e.g. an application server can also be provided to the TCU in order to assist in the transfer into the eDRX mode.

Thus, in one embodiment, there is the further step, S14, in which information concerning a status of the vehicle is exchanged with an application in an application server before the request of an extended discontinuous reception mode, or at least before such request being implemented. The application server is typically an OEM server serving vehicles with automotive services.

In step S15, an extended discontinuous reception mode for the TCU is requested, proposing the determined extended discontinuous reception time. Such requests are, as such, known in prior art. The request can be initiated by the TCU and performed by either the TCU itself or by another node. The initiation of the request is made as a response to obtained discontinuity-beneficial conditions, discussed further above.

In step S16, an accept of the extended discontinuous reception mode is received.

In step S17, a transfer of the TCU into the extended discontinuous reception mode is managed. Such management is, as such, known in prior art. The managing may comprise shut-down communication with the different communication systems. The managing may also comprise non-communicative transfers, relying on the communication systems to autonomously arrange for suddenly missing TCUs. In other words, if a TCU shut downs its communication without informing the communication system, the communication system may anyway, after noticing that the TCU does not provide any signalling, conclude that the TCU has shut down the communication.

In embodiments involving interruption of an eDRX mode or during the hysteresis time of an initiation process, a step S18 may be performed, in which vehicle conditions demanding an, possibly early, ending of the eDRX mode is obtained. This is typically performed in cooperation with the vehicle control system. The conditions are associated with an expected activity of the vehicle. Non-exclusive examples are status conditions of the engine, the lock of the vehicle or any presence of a driver. Further examples were discussed in connection with FIG. 3, further above.

In particular embodiments, a step S19 comprises managing of a transfer out of eDRX mode. Such management is, as such, known in prior art. The managing may comprise finding an opening of communication with the different communication systems.

The flow diagrams of FIGS. 3 and 4 are different views of essentially the same task. There are therefore connections or similarities between the different steps. Steps S1 and S11 are essentially corresponding steps, as well as steps S5 and S14. Step S6 is a common step involving activities of e.g. S12, S13, S15, S16 and S17. Steps S9 and S18 are essentially corresponding steps, as well as steps S10 and S19.

The proposed technology may be applied to a user terminal, which may be a wired or wireless device.

As used herein, the non-limiting terms "Telematic control unit (TCU)", "Telematics Module (TEM)", "On Board Unit (OBU)", "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a TCU, wherein the TCU is configured to obtaining of information of conditions, associated with a vehicle to which the TCU is connected, indicating that an extended discontinuous reception mode would be beneficial for the TCU. The TCU is further configured to obtain a determination of an extended discontinuous reception time for the TCU to propose. The TCU is further configured to request an extended discontinuous reception mode for the TCU, proposing the determined extended discontinuous reception time. The TCU is further configured to receive an accept of the extended discontinuous reception mode. The TCU is further configured to manage a transfer of the TCU into the extended discontinuous reception mode.

Figure 5:
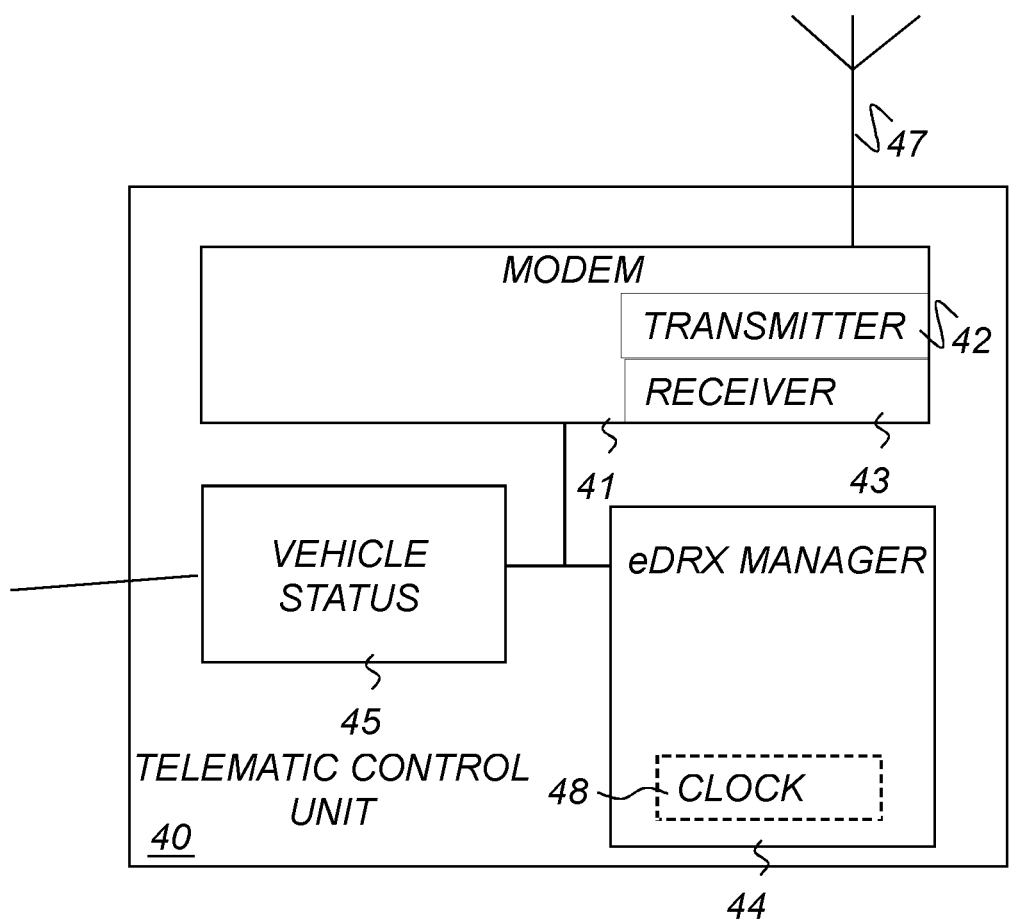
FIG. 5 is a schematic block diagram of an embodiment of a TCU.

FIG. 5 is a schematic block diagram of an embodiment of a TCU 40. The TCU 40 comprises a modem 41, in turn having a transmitter 42 and a receiver 43, used for wireless communication with different networks via an antenna 47. A vehicle status section 45 is in communication contact with a main vehicle control section. The vehicle status section 45 is configured for obtaining information of conditions, associated with a vehicle to which the TCU is connected, indicating that an eDRX mode would be beneficial for the TCU. The TCU 40 can be implemented as a separate unit or can be implemented as an integrated part of the vehicle control system. An eDRX manager 44 is connected to the modem 41 and the vehicle status section 45 and is configured for requesting an eDRX mode, receiving an accept of the eDRX mode and managing the transfer of the TCU into the eDRX mode. In a particular embodiment, the eDRX manager 44 may be at least partly involved in the determination of an eDRX mode time for the TCU to propose. The eDRX manager 44 optionally comprises a clock 48, keeping track on the time in the eDRX mode.

In one embodiment, a TCU is preferably configured to operate to cooperate with a cooperative intelligent transport system. The TCU is configured to obtain information of discontinuity-beneficial conditions, associated with a vehicle to which the TCU is connected. The discontinuity-beneficial conditions indicate that an extended discontinuous reception mode would be beneficial for the TCU. The TCU is further configured to obtain a determination of an extended discontinuous reception time for the TCU to propose. The TCU is further configured to initiate a request for an extended discontinuous reception mode for the TCU as a response to obtained discontinuity-beneficial conditions, proposing the determined extended discontinuous reception time.

Figure 6:
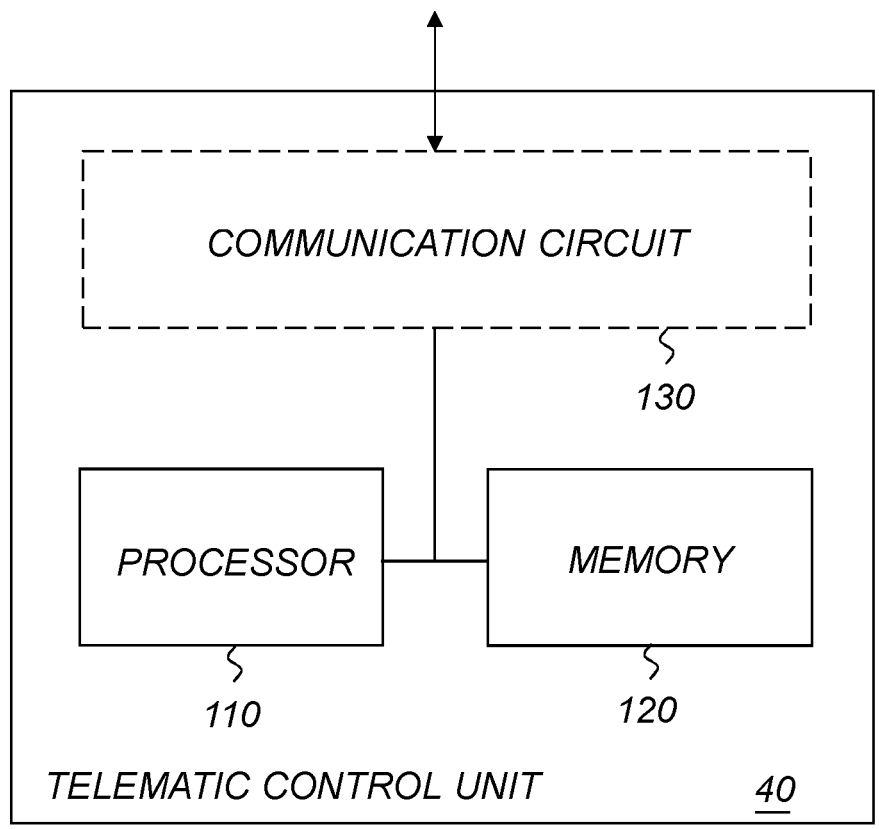
FIG. 6 is a schematic block diagram illustrating an embodiment of a TCU.

FIG. 6 is a schematic block diagram illustrating an example of a TCU 40, based on a processor-memory implementation according to an embodiment. In this particular example, the TCU 40 comprises a processor 110 and a memory 120, the memory 120 comprising instructions executable by the processor 110, whereby the processor is operative to obtain information of conditions, associated with a vehicle to which the TCU is connected, indicating that an extended discontinuous reception mode would be beneficial for the TCU. The processor is further operative to obtain a determination of an extended discontinuous reception time for the TCU to propose.

In one embodiment, the processor is further operative to initiate the request for said extended discontinuous reception mode.

In one embodiment, the processor is further operative to request an extended discontinuous reception mode for the TCU, proposing the determined extended discontinuous reception time.

In a further embodiment, the processor is further operative to receive an accept of the extended discontinuous reception mode. The processor is further operative to manage a transfer of the TCU into the extended discontinuous reception mode.

The TCU 40 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

In different embodiments, the TCU may comprise communication circuitry configured to perform at least one of:
the communicating with the vehicle internal system;
the communicating with at least one of application servers serving vehicles with automotive services, a vehicle internal system of the vehicle, C-ITS nodes, the receiving of information from positioning satellites, and the use of the wireless communication network;
the receiving of the determined extended discontinuous reception time from one of the vehicle internal system, the C-ITS nodes, the positioning satellites, and the wireless communication network;
the receiving of data of discontinuity-time influencing parameters from at least one of application servers serving vehicles with automotive services, the vehicle internal system of the vehicle, the C-ITS nodes, the positioning satellites, and the wireless communication network;
the receiving of an accept of the extended discontinuous reception mode; and
the exchange of information concerning a status of said vehicle with an application server serving vehicles with automotive services.

Figure 7:
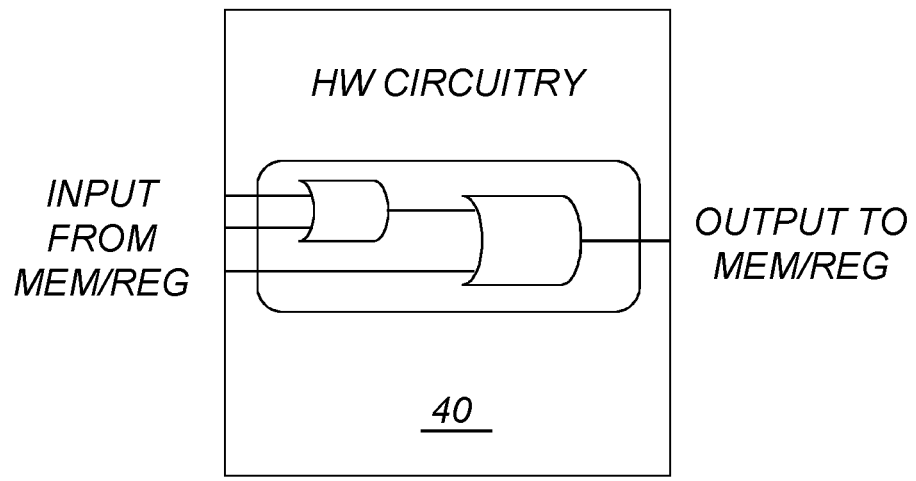
FIG. 7 is a schematic block diagram illustrating another embodiment of a TCU.

FIG. 7 is a schematic block diagram illustrating another example of a TCU 40, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 8:
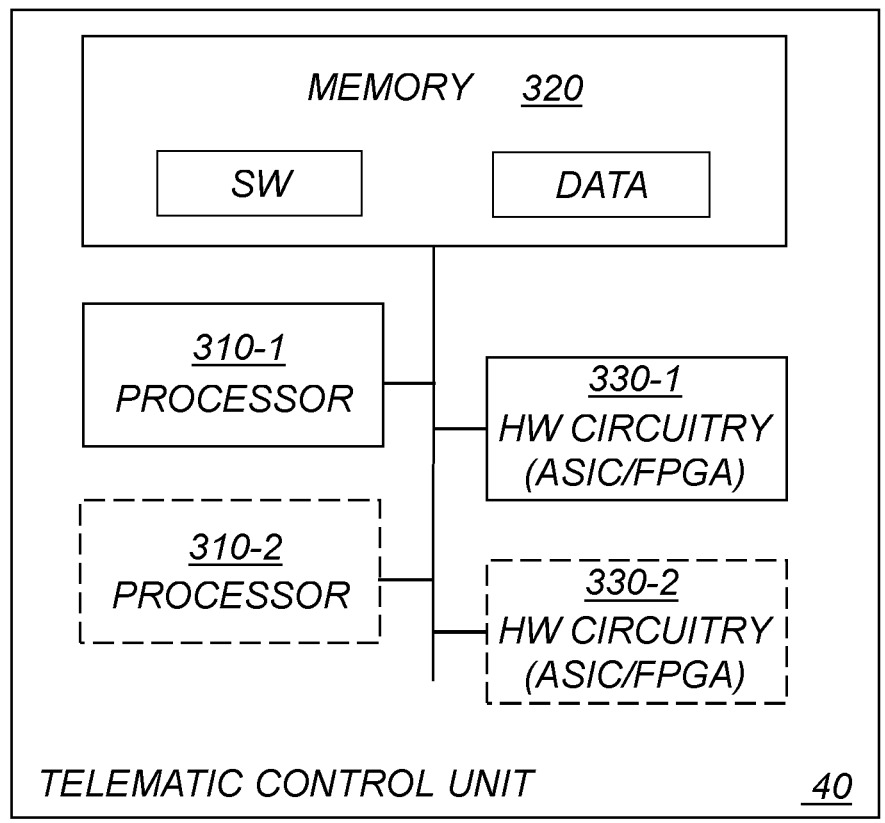
FIG. 8 is a schematic block diagram illustrating yet another embodiment of a TCU.

FIG. 8 is a schematic block diagram illustrating yet another example of a TCU 40, based on combination of both processor(s) 310-1, 310-2 and hardware circuitry 330-1, 330-2 in connection with suitable memory unit(s) 320. The arrangement 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 9:
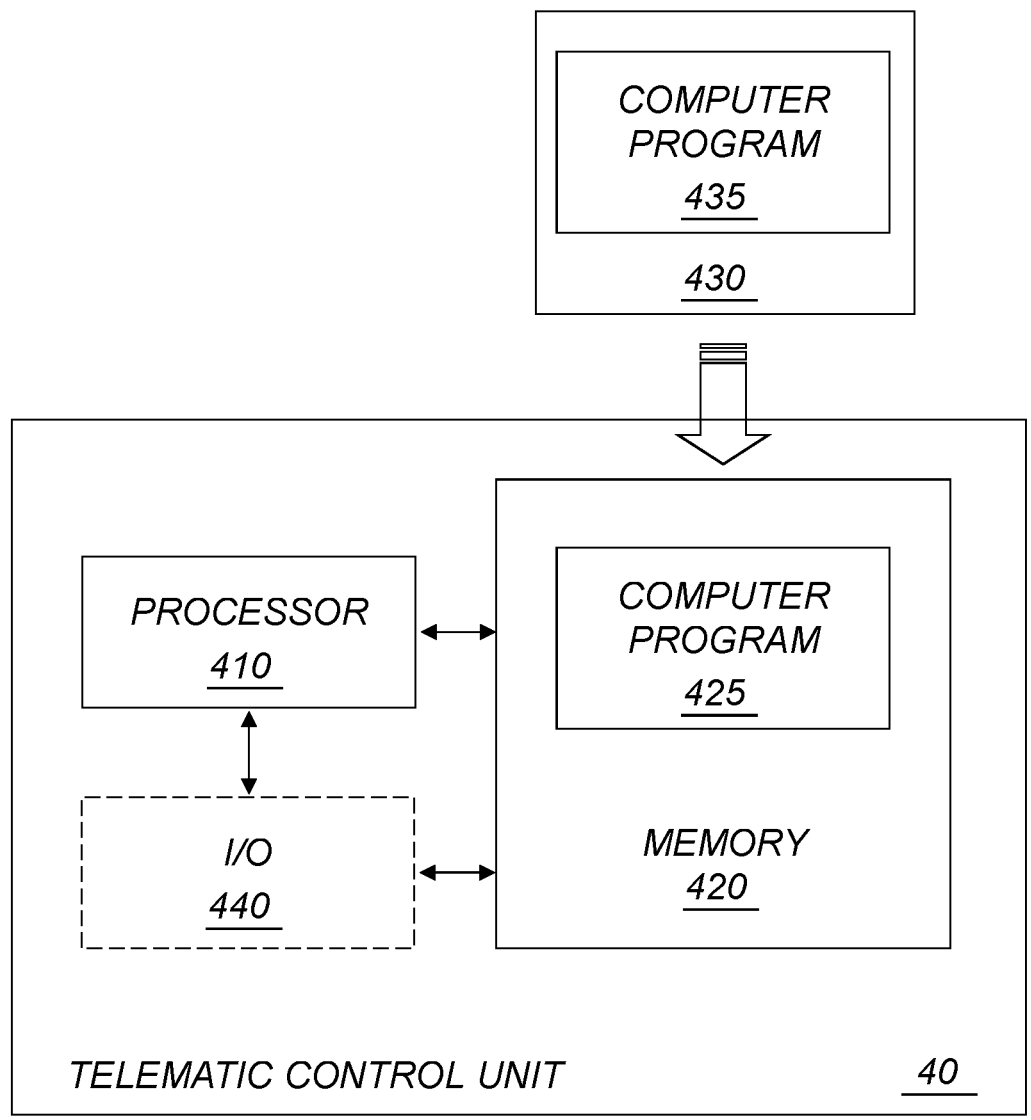
FIG. 9 is a schematic diagram illustrating an example of a computer-implementation.

FIG. 9 is a schematic diagram illustrating an example of a computer-implementation 40 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to obtain information of conditions, associated with a vehicle to which the TCU is connected, indicating that an extended discontinuous reception mode would be beneficial for the TCU, to obtain a determination of an extended discontinuous reception time for the TCU to propose, to request an extended discontinuous reception mode for the TCU, proposing the determined extended discontinuous reception time, to receive an accept of the extended discontinuous reception mode, and to manage a transfer of the TCU into the extended discontinuous reception mode.

In a particular embodiment, the computer program comprises instructions, which when executed by at least one processor, cause the processor(s) to obtain information of conditions, associated with a vehicle to which the TCU is connected, indicating that an extended discontinuous reception mode would be beneficial for the TCU, to obtain a determination of an extended discontinuous reception time for the TCU to propose, to request an extended discontinuous reception mode for the TCU, proposing the determined extended discontinuous reception time, to receive an accept of the extended discontinuous reception mode, and to manage a transfer of the TCU into the extended discontinuous reception mode.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 10:
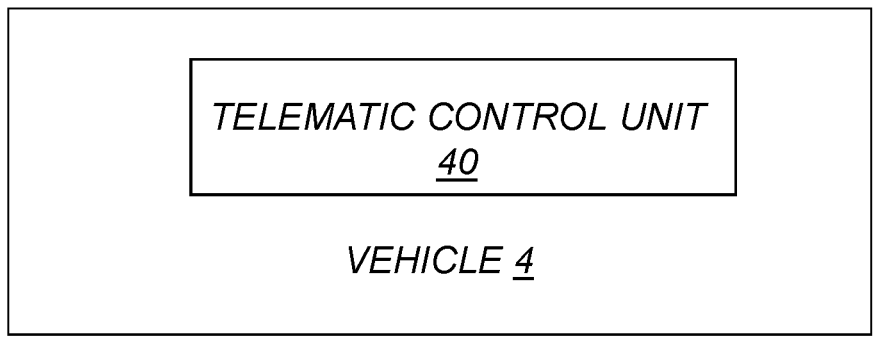
FIG. 10 is a schematic block diagram illustrating an example of a vehicle comprising a TCU.

FIG. 10 is a schematic block diagram illustrating an example of a vehicle 4 comprising a TCU 40 according to any of the embodiments.

According to an aspect, there is provided a network device comprising a TCU as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit in a wireless communication system, wherein the communication unit comprises a TCU 40 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 11:
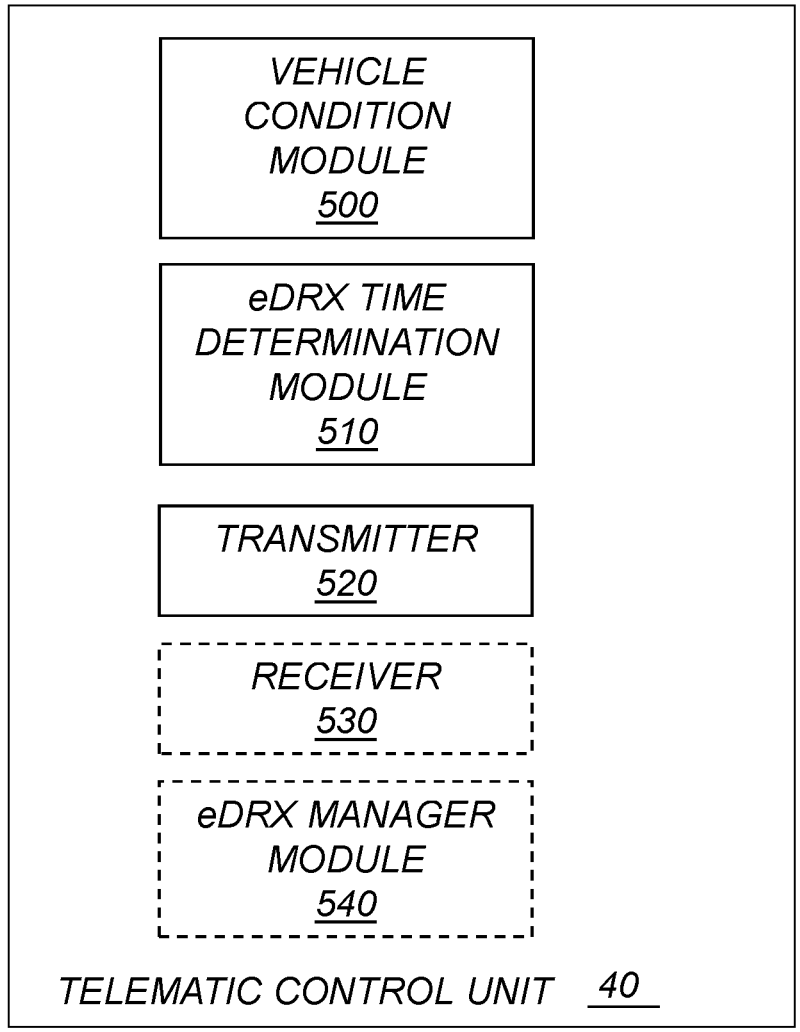
FIG. 11 is a schematic diagram illustrating an example of a TCU for use in a cooperative intelligent transport system.

FIG. 11 is a schematic diagram illustrating an example of a TCU 40, which preferably is used in cooperation with an OEM application and a cellular network. The TCU 40 comprises a vehicle condition module 500 for obtaining information of conditions, associated with a vehicle to which the TCU is connected, indicating that an extended discontinuous reception mode would be beneficial for the TCU. The TCU 40 further comprises an eDRX time determination module 510 for obtaining a determination of an extended discontinuous reception time for the TCU to propose. The TCU 40 further comprises a transmitter 520 for initiating a request of an extended discontinuous reception mode for the TCU, proposing the determined extended discontinuous reception time. The TCU 40 preferably further comprises a receiver 530 for receiving an accept of the extended discontinuous reception mode. The TCU 40 preferably further comprises an eDRX manager module 540 for managing a transfer of the TCU into the extended discontinuous reception mode.

In one embodiment, a TCU comprises a condition obtaining module for obtaining of information of discontinuity-beneficial conditions, associated with a vehicle to which the TCU is connected. The discontinuity-beneficial conditions indicate that an extended discontinuous reception mode would be beneficial for the TCU. The TCU further comprises a time determination obtaining module for obtaining a determination of an extended discontinuous reception time for the TCU to propose. The TCU further comprises an initiator for initiating a request for an extended discontinuous reception mode for the TCU as a response to obtained discontinuity-beneficial conditions, proposing the determined extended discontinuous reception time.

Alternatively it is possible to realize the module(s) in FIG. 11 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 12:
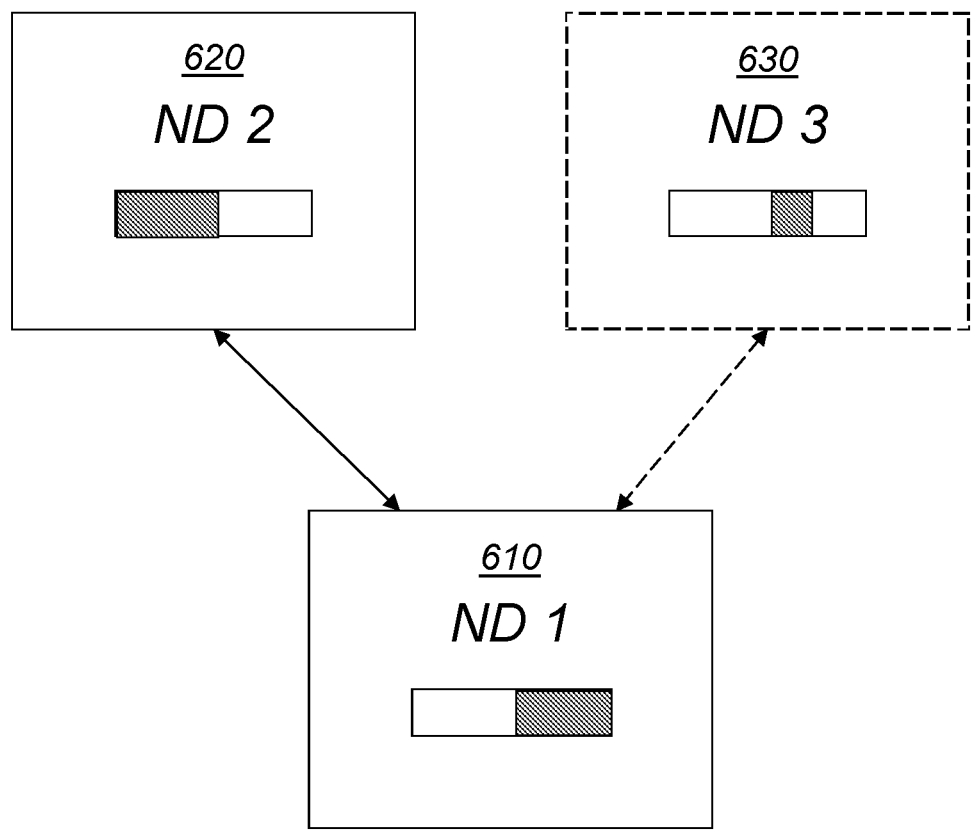
FIG. 12 is a schematic diagram illustrating an example of how functionality can be distributed or partitioned between different network devices.

FIG. 12 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 13:
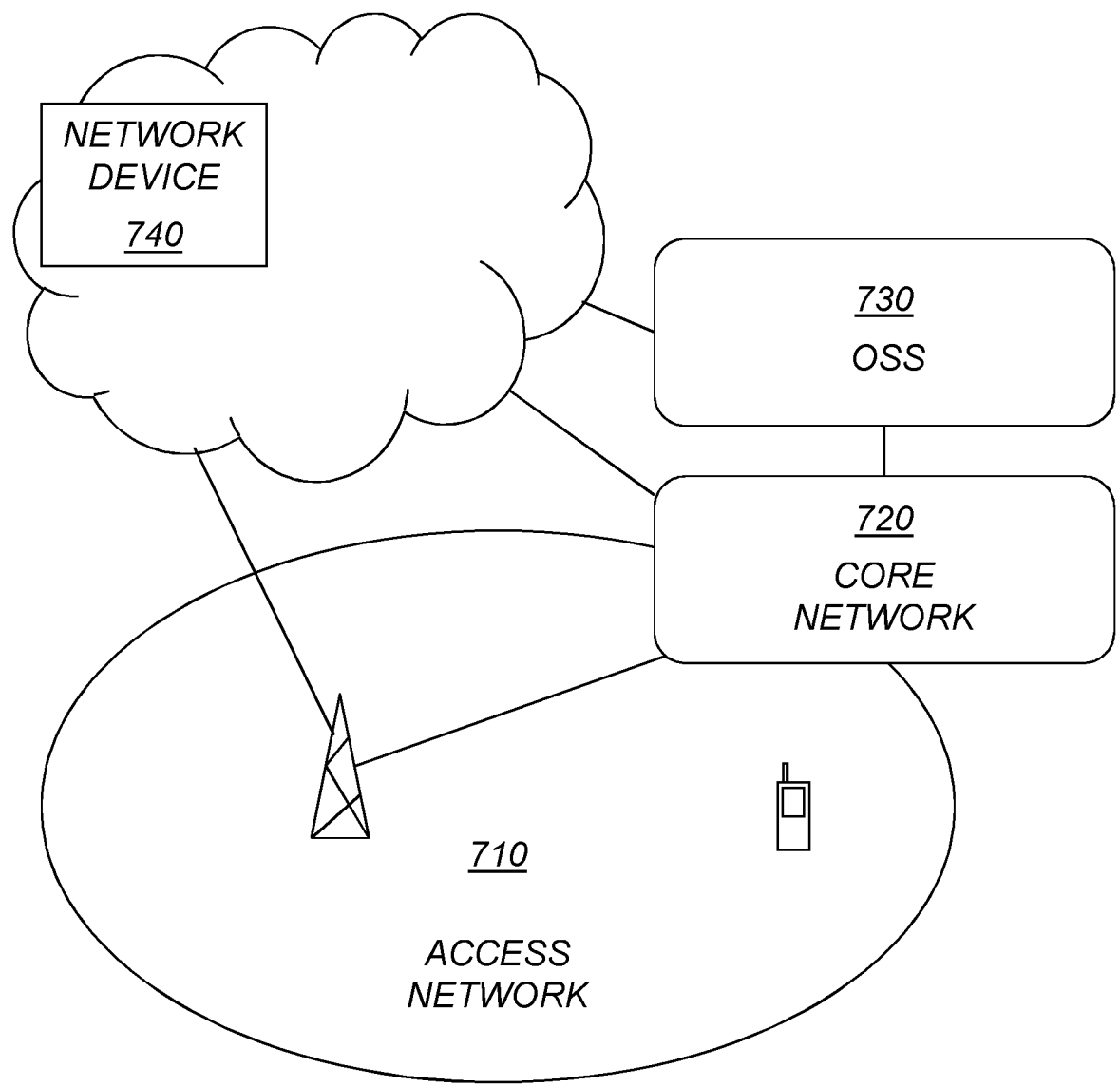
FIG. 13 is a schematic diagram illustrating an example of a wireless communication system.

FIG. 13 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP $3^{rd}$ Generation Partnership Project
ASIC Application Specific Integrated Circuits
BTS Base Transceiver Stations
CD Compact Disc
C-ITS Cooperative Intelligent Transport Systems
CONVERGE COmmunication Network VEhicle Road Global Extension
COTS Common Off-The-Shelf
CPE Customer Premises Equipment
CPU Central Processing Units
DSP Digital Signal Processors
DSRC Dedicated Short-Range Communications
DVD Digital Versatile Disc
eDRX extended Discontinuous Reception
eNB evolved Node B
FPGA Field Programmable Gate Arrays
GNSS Global Navigation Satellite System
GPS Global Positioning System
HDD Hard Disk Drive
HW hardware
ICT Information and Communications Technology
I/O input/output
ITS Intelligent Transport Systems
LEE Laptop Embedded Equipment
LME Laptop Mounted Equipment
LTE Long-Term Evolution
MEM memory units
ND Network Device
NFV Network Function Virtualization
NI Network Interfaces
NIC Network Interface Controller
OBD II On Board Diagnostics II
OBU On Board Unit
OEM Original Equipment Manufacturer
OS Operating System
OSS Operations and Support System
PC Personal Computer
PDA Personal Digital Assistant
PLC Programmable Logic Controllers
RAM Random Access Memory
REG registers
ROM Read-Only Memory
RRU Remote Radio Unit RSU Road Side Unit
STA Station
SW software
TA Tracking Area
TCU Telematics Control Unit
TEM Telematics Module
UE User Equipment
UL UpLink
USB Universal Serial Bus
V2I Vehicle-to-Infrastructure
V2N Vehicle-to-Network
V2P Vehicle-to-Pedestrian
V2V Vehicle-to-Vehicle
V2X Vehicle-to-anything
VM Virtual Machine
VMM Virtual Machine Monitor
VNE Virtual Network Element
WNIC Wireless Network Interface Controller

The invention claimed is:

1. A method for control of a telematic control unit, wherein the method comprises the steps of said telematics control unit:
   obtaining of information of discontinuity-beneficial conditions, associated with a vehicle to which said telematic control unit is connected;
   said discontinuity-beneficial conditions indicating that an extended discontinuous reception mode would be beneficial for said telematic control unit;
   obtaining a determination of an extended discontinuous reception time for said telematic control unit to propose; and
   initiating a request for an extended discontinuous reception mode for said telematic control unit as a response to obtained discontinuity-beneficial conditions, proposing said determined extended discontinuous reception time.

2. The method according to claim 1, wherein said step of obtaining of information of discontinuity-beneficial conditions comprises communicating with a vehicle internal system.

3. The method according to claim 1, wherein said discontinuity-beneficial conditions comprises at least one of vehicle inactivity conditions, person non-presence conditions, energy conditions, time conditions and location conditions.

4. The method according to claim 1, wherein said step of initiating said request for said extended discontinuous reception mode is performed after expiration of a hysteresis time starting at said obtaining of information of said discontinuity-beneficial conditions.

5. The method according to claim 1, wherein said step of obtaining a determination of an extended discontinuous reception time comprises communicating with at least one of application servers serving vehicles with automotive services, a vehicle internal system of said vehicle, Cooperative Intelligent Transport Systems nodes, receiving information from positioning satellites, and using a wireless communication network.

6. The method according to claim 5, wherein said step of obtaining a determination of an extended discontinuous reception time comprises receiving said determined extended discontinuous reception time.

7. The method according to claim 6, wherein said determination of said extended discontinuous reception time is based on data of discontinuity-time influencing parameters.

8. The method according to claim 5, wherein said step of obtaining a determination of an extended discontinuous reception time comprises:
   receiving data of discontinuity-time influencing parameters from at least one of said application servers serving vehicles with automotive services, said vehicle internal system of said vehicle, said Cooperative Intelligent Transport Systems nodes, said positioning satellites, and said wireless communication network; and
   performing a determining of said extended discontinuous reception time based on said received data of discontinuity-time influencing parameters.

9. A telematic control unit, wherein said telematic control unit is configured to obtain information of discontinuity-beneficial conditions, associated with a vehicle to which said telematic control unit is adapted to be connected;
   said discontinuity-beneficial conditions indicating that an extended discontinuous reception mode would be beneficial for said telematic control unit;
   wherein said telematic control unit is further configured to obtain a determination of an extended discontinuous reception time for said telematic control unit to propose; and
   wherein said telematic control unit is further configured to initiate a request for an extended discontinuous reception mode for said telematic control unit as a response to obtained discontinuity-beneficial conditions, proposing said determined extended discontinuous reception time.

10. The telematic control unit according to claim 9, wherein said telematic control unit comprises a processor and a memory, said memory comprising instructions executable by the processor, whereby the processor is operative to obtain said information of discontinuity-beneficial conditions, to obtain said determination of said extended discontinuous reception time and to initiate said request for said extended discontinuous reception mode.

11. The telematic control unit according to claim 9, wherein said telematic control unit is further configured to perform said obtaining of information of discontinuity-beneficial conditions comprising communicating with a vehicle internal system.

12. The telematic control unit according to claim 9, wherein said discontinuity-beneficial conditions comprises at least one of vehicle inactivity conditions, person non-presence conditions, energy conditions and time conditions.

13. The telematic control unit according to claim 9, wherein said telematic control unit is further configured to perform said initiating of said request for said extended discontinuous reception mode after expiration of a hysteresis time starting at said obtaining of information of said discontinuity-beneficial conditions.

14. The telematic control unit according to claim 9, wherein said telematic control unit is further configured to perform obtaining of said determination of said extended discontinuous reception time comprising communicating with at least one of application servers serving vehicles with automotive services, a vehicle internal system of said vehicle, Cooperative Intelligent Transport Systems nodes, receiving information from positioning satellites, and using a wireless communication network.

15. A non-transitory computer-readable storage medium comprising instructions, which when executed by at least one processor, cause the at least one processor to obtain information of discontinuity-beneficial conditions, associated with a vehicle to which an telematic control unit is connected;

said discontinuity-beneficial conditions indicating that an extended discontinuous reception mode would be beneficial for said telematic control unit;
wherein said instructions, when executed by at least one processor, further cause the at least one processor to obtain a determination of an extended discontinuous reception time for said telematic control unit to propose; and
wherein said instructions, when executed by at least one processor, further cause the at least one processor to initiate a request for an extended discontinuous reception mode for said telematic control unit as a response to obtained discontinuity-beneficial conditions, proposing said determined extended discontinuous reception time.

* * * * *